United States Patent
Chono

(10) Patent No.: US 7,835,440 B2
(45) Date of Patent: Nov. 16, 2010

(54) MOVING PICTURE CODING METHOD AND DECODING METHOD, AND APPARATUS AND PROGRAM USING THE SAME

(75) Inventor: Keiichi Chono, Tokyo (JP)

(73) Assignee: NEC Corporation, Tokyo (JP)

( * ) Notice: Subject to any disclaimer, the term of this patent is extended or adjusted under 35 U.S.C. 154(b) by 1714 days.

(21) Appl. No.: 10/503,317

(22) PCT Filed: Apr. 16, 2003

(86) PCT No.: PCT/JP03/04797

§ 371 (c)(1),
(2), (4) Date: Jul. 30, 2004

(87) PCT Pub. No.: WO03/092300

PCT Pub. Date: Nov. 6, 2003

(65) Prior Publication Data

US 2005/0105617 A1    May 19, 2005

(30) Foreign Application Priority Data

Apr. 24, 2002  (JP) .............................. 2002-122379

(51) Int. Cl.
*H04N 7/12* (2006.01)
*G06K 9/36* (2006.01)

(52) U.S. Cl. .................. 375/240.16; 382/238

(58) Field of Classification Search .......... 348/699, 348/718, 409, 413, 416, 606, 614, 620, 714, 348/763, 404, 407, 411, 412, 415, 280, 223, 348/272, 273, 277, 223.1, 241, 607, 146; 382/45, 232, 233, 236, 239, 251, 261, 263, 382/264, 260, 269, 266, 238, 224; 375/240, 375/240.16, 240.12, 240.29

See application file for complete search history.

(56) References Cited

U.S. PATENT DOCUMENTS 5,475,501 A * 12/1995 Yagasaki .................... 382/250
5,990,962 A * 11/1999 Ueno et al. ............ 375/240.16

(Continued)

FOREIGN PATENT DOCUMENTS

JP         63-309082         12/1988

(Continued)

OTHER PUBLICATIONS

Lowell L. Winger, Anastasios N. Venetsanopoulos, "Space-frequency block motion field modeling for video coding", Journal of Electronic Imaging vol. 10, No. 2, Apr. 2001, p. 486-497.

(Continued)

*Primary Examiner*—Behrooz Senfi
(74) *Attorney, Agent, or Firm*—Scully, Scott, Murphy & Presser, P.C.

(57) ABSTRACT

The present invention seeks to provide a solution to the problem that motion compensation in an encoding method of the prior art involves decimal point picture element interpolation by means of fixed filters and therefore cannot realize interpolation of decimal point picture elements that accords with the nature and bit rate of a moving picture. A filter/interpolated image memory (101) interpolates picture elements of decimal point positions in a reference image by means of a plurality of sets of filters, a motion vector/filter detector (102) detects the combination of filter and motion vector that realizes the highest encoding efficiency, a prediction value generator (103) uses the detected combination of filter and motion vector to generate a prediction value, and motion vector/filter detector (102) supplies as output the information of the filter and information of the motion vector that generated the prediction value; whereby decimal point picture element interpolation that corresponds to the nature and bit rate of the moving picture can be realized and encoding of a moving picture can be improved.

28 Claims, 14 Drawing Sheets

U.S. PATENT DOCUMENTS

| | | | | |
|---|---|---|---|---|
| 6,259,734 | B1 * | 7/2001 | Boon | 375/240 |
| 7,379,501 | B2 * | 5/2008 | Lainema | 375/240.29 |
| 2003/0031253 | A1 * | 2/2003 | Itokawa | 375/240.08 |
| 2003/0058949 | A1 * | 3/2003 | MacInnis et al. | 375/240.29 |
| 2003/0095136 | A1 * | 5/2003 | Greggain | 345/646 |
| 2003/0117585 | A1 * | 6/2003 | Lee | 352/244 |
| 2003/0169931 | A1 * | 9/2003 | Lainema | 382/236 |
| 2003/0194009 | A1 * | 10/2003 | Srinivasan | 375/240.16 |

FOREIGN PATENT DOCUMENTS

| | | |
|---|---|---|
| JP | 05-219498 | 8/1993 |
| JP | 06-121174 | 4/1994 |
| JP | 06-038197 | 10/1994 |
| JP | 09-139922 | 5/1997 |
| JP | 10-070717 | 3/1998 |
| JP | 10-178560 | 6/1998 |
| JP | 10-257496 | 9/1998 |
| JP | 11-046364 | 2/1999 |
| JP | 2003-169337 | 6/2003 |
| JP | 2005-501442 | 1/2005 |

OTHER PUBLICATIONS

Wedi T., "Adaptive Interpolation Filter for Motion Compensated Hybrid Video Coding", *Proceedings of the Picture Coding Symposium*, pp. 49-52 (2001), XP-008068898.

Wedi T., "Adaptive Interpolation Filter for H.26L. Document VCEG-N28 Filename VCEG-N28.doc Generated Sep. 16, 2001", ITU Study Group 16-Video Coding Experts Group, pp. 1-7 (Sep. 24, 2001), XP-002398691.

Zhong S. et al., "Improved Sub-Pel Interpolation Filters", Joint Video Team (JVT) of ISO/IEC MPEG & ITU-T VCEG(ISO/IEC JTC1/SC29/WG11 and ITU-T SG16 Q6), No. VCEG-N51r1, (7 pages total) (Oct. 2, 2001), XP030003301.

Chono K. et al., "Adaptive Motion Interpolation on MB-Basis", Joint Video Team (JVT) of ISO/IEC MPEG & ITU-T VCEG (ISO/IEC JTC1/SC29/WG11 and ITU-T SG16 Q.6), No. JVT-C040 (21 pages total) (May 10, 2002), XP030005148.

Supplementary European Search Report dated May 17, 2010.

* cited by examiner

First-stage interpolation (filter1)

Second-stage interpolation (filter1)

First-stage interpolation
(filter1 having phase shifted 1/4 to the left)

Second-stage interpolation (filter2)

First-stage interpolation
(filter1 having phase shifted 1/4 to the right)

Second-stage interpolation (filter2)

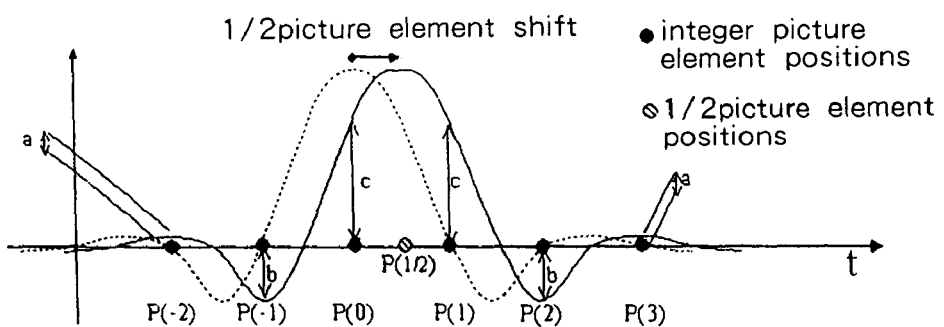
Fig.14(a) Filter coefficient A(a,b,c,c,b,a) for 1/2 picture element interpolation
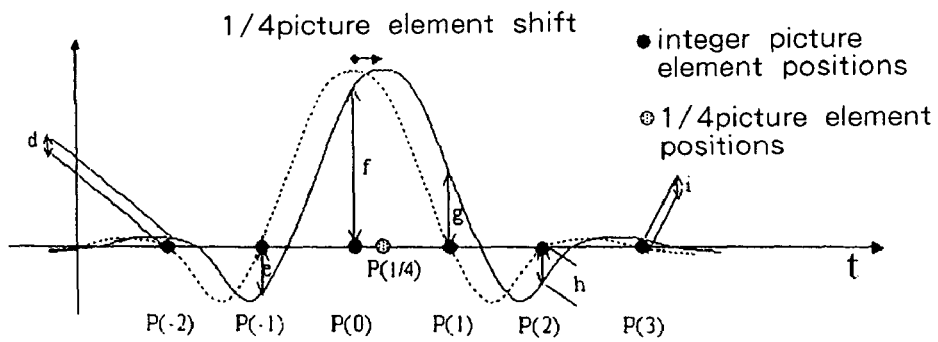
Fig.14(b) Filter coefficient B(d,e,f,g,h,i) for 1/4 picture element interpolation Fig.15
Fig.15(a)
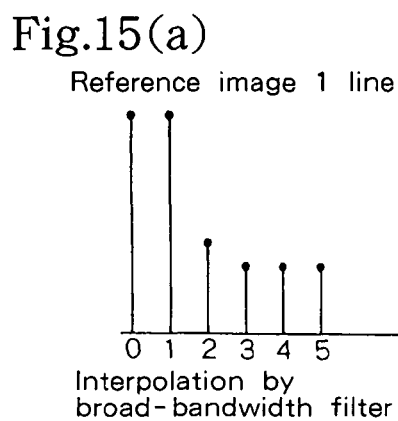
Fig.15(b)
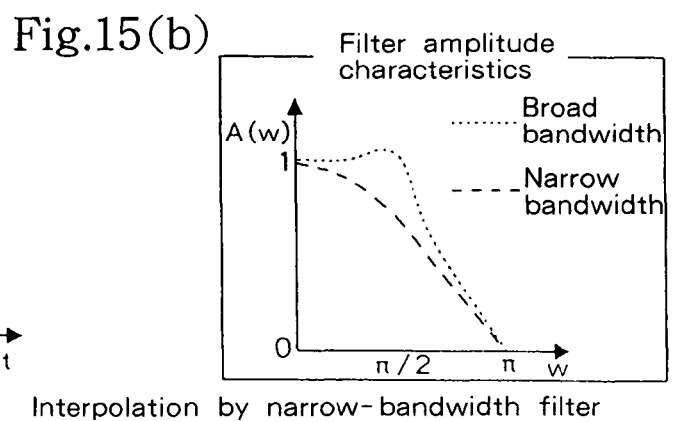
Interpolation by broad-bandwidth filter    Interpolation by narrow-bandwidth filter
Fig.15(c)
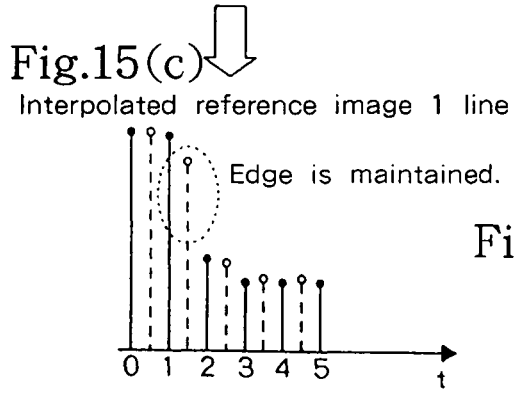
Fig.15(d)
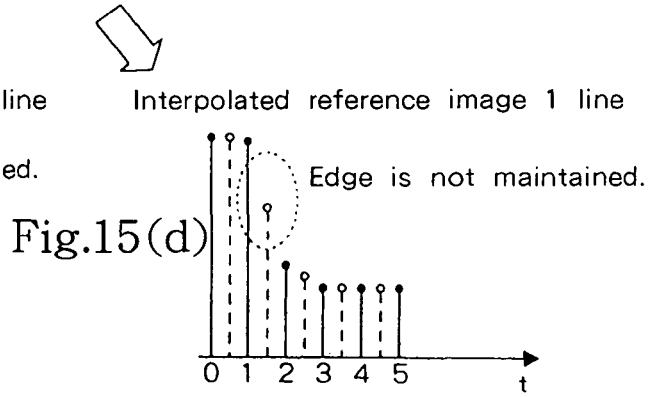

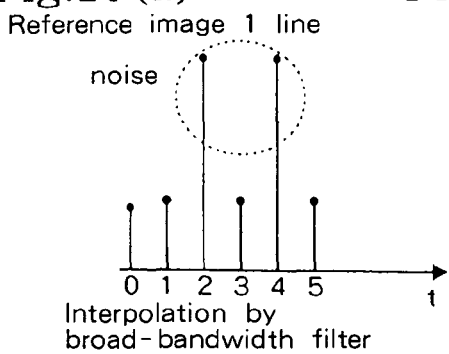
Fig.16(a)
Reference image 1 line
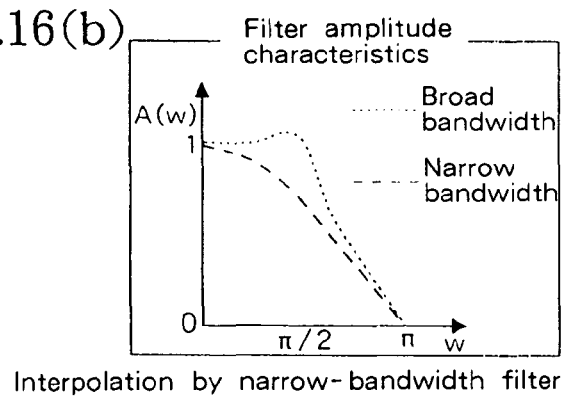
Fig.16(b)
Interpolation by broad-bandwidth filter
Interpolation by narrow-bandwidth filter
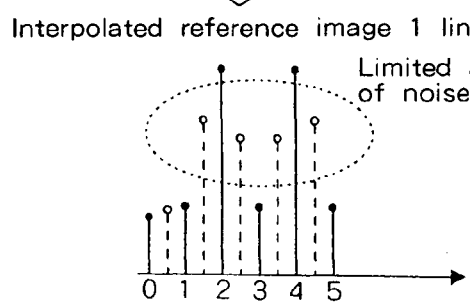
Fig.16(c)
Interpolated reference image 1 line
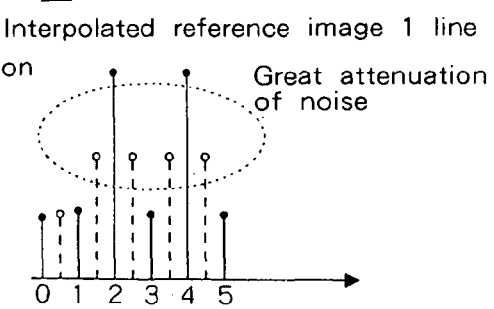
Fig.16(d)
Interpolated reference image 1 line
Fig.17
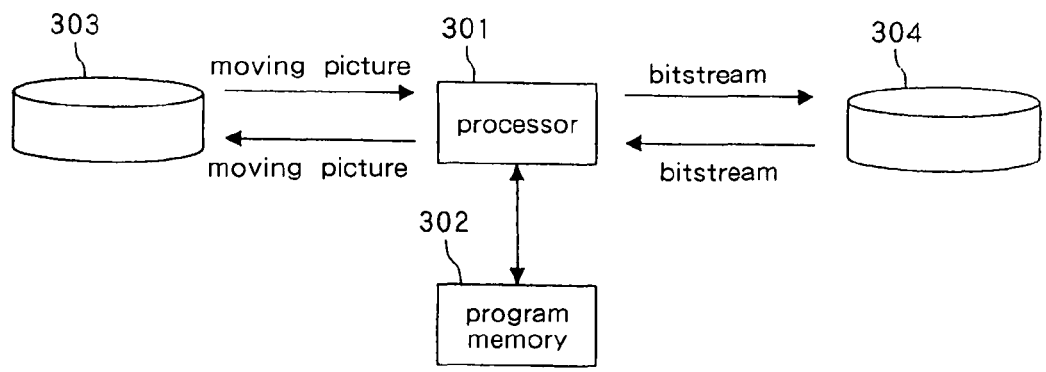

MOVING PICTURE CODING METHOD AND DECODING METHOD, AND APPARATUS AND PROGRAM USING THE SAME

BACKGROUND OF THE INVENTION

1. Field of the Invention

The present invention relates to a moving picture encoding and decoding method, and in particular, relates to a moving picture encoding/decoding program, method, and device in which filter coefficients are adaptively switched to encode the interpolation of decimal-point picture elements used in motion compensation.

2. Description of the Related Art

In digital broadcast systems or services, a large number of moving picture signals are compressed and encoded for transmission and storage.

FIG. 1 is a block diagram showing the configuration of a typical encoding device for moving picture signals. The encoding device that is shown in FIG. 1 includes a local decoder and is made up of: frequency converter 11, quantizer 12, variable-length encoder 13, reverse quantizer 14, reverse frequency converter 15, frame memory 16, motion compensator 17, and motion vector detector 18.

An input image is applied as input to the encoder and divided into a plurality of blocks. When an input image is subjected to interframe prediction, the prediction values, which are generated from previously decoded images, are subtracted in each of the blocks by motion compensator 17. Interframe prediction is a method of using a previously reconstructed reference image to encode a current image.

These image blocks are next converted to frequency regions by frequency converter 11. The image blocks that have been converted to frequency regions are next quantized by quantizer 12. The image blocks that have been quantized are finally subjected to entropy encoding by variable-length encoder 13 and then stored.

As the local decoding, the above-described quantized image blocks are again returned to the original space regions by reverse quantizer 14 and reverse frequency converter 15.

In the case of interframe prediction, the above-described prediction values are added to image blocks to form a reconstructed image. This reconstructed image is used in encoding the next image and is therefore called a reference image. The above-described reference image is stored in frame memory 16 and used in motion vector detector 18 and motion compensator 17. Motion vector detector 18 detects motion vectors from the blocks of the input image and the above-described reference image. Motion compensator 17 generates prediction values from the above-described motion vectors and the above-described reference image.

FIG. 2 is a block diagram showing the configuration of the decoder that corresponds to the encoder shown in FIG. 1. The decoder that is shown in FIG. 2 is made up of: variable-length decoder 19, reverse quantizer 20, reverse frequency converter 21, motion compensator 22, and frame memory 23. The operations of reverse quantizer 20, reverse frequency converter 21, motion compensator 22, and frame memory 23 are the same as the operations of reverse quantizer 14, reverse frequency converter 15, motion compensator 17 and frame memory 16 in the encoder.

In decoding, the input is first restored from the encoded representation to the original representation by means of variable-length decoder 19. Reverse quantization and reverse frequency conversion are next performed on the decoded conversion coefficients to restore the conversion coefficients to space region image blocks. When performing interframe prediction, the prediction values are added to the image blocks that have been restored to space regions to form a reconstructed image. These prediction values are generated by means of the reference image that has been stored in frame memory 23 and motion vectors that are supplied from variable-length decoder 19. A reconstructed image is used in the image that is next to be decoded, and is therefore stored in frame memory 23.

Means for improving the efficiency of encoding the above-described moving picture signal include the use of a prefilter or motion compensation of decimal point picture element accuracy. A prefilter improves the encoding efficiency by using a filter to manipulate the bandwidth of the input image. In contrast, motion compensation of decimal point picture element accuracy improves the encoding efficiency by producing motion of decimal point accuracy in the reference image.

A prefilter limits the bandwidth of the input image, and therefore does not directly improve the encoding efficiency of a motion picture. Motion compensation of decimal point picture element accuracy in the prior art uses fixed filters to interpolate decimal point picture elements. As a consequence, the methods of the prior art are incapable of decimal point picture element interpolation that accords with bit rate and the nature of the moving picture.

SUMMARY OF THE INVENTION

The present invention was realized in view of the above-described prior art and has an object the provision of a method of encoding/decoding a moving picture that can enhance the effect of motion compensation and improve encoding efficiency.

The first embodiment of the present invention is a moving picture encoding program, method, or device for detecting motion of decimal point accuracy; whereby:

picture elements of decimal point positions in a reference image are interpolated by a plurality of sets of filters;

the combination of filter and motion vector that realize the highest encoding efficiency is detected; the detected filter and motion vector are used to generate a prediction value; and information of the motion vector and information of the filter that generated the prediction value are supplied as output.

According to the above-described configuration, the filter and motion vectors for which the encoding efficiency is highest are detected, and the prediction value that is generated by the detected filter and motion vector is used in motion compensation, whereby the encoding efficiency of a moving picture can be improved.

The second embodiment of the present invention is a moving picture decoding program, method, or device for performing motion compensation of decimal point accuracy, whereby:

based on filter information that has been applied as input, a filter or interpolation frames that are referred to are switched; and the filter or interpolation frames that are referred to that have been switched and motion vectors that have been applied as input are used to generate a prediction value.

The third embodiment of the present invention is the moving picture encoding program, method, or device of the first embodiment, wherein:

a plurality of filters in which at least phases are different is used to interpolate picture elements of the decimal point positions.

The third embodiment raises the accuracy of motion compensation and improves the encoding efficiency.

The fourth embodiment of the present invention is the moving picture decoding program, method, or device according to the second embodiment, wherein:

a plurality of filters in which at least phases are different is used to interpolate picture elements of decimal point positions.

The fifth embodiment of the present invention is a moving picture encoding program, method, or device according to the first embodiment, wherein:

a plurality of filters in which at least bandwidths are different is used to interpolate the above-described picture elements of decimal point positions.

The fifth embodiment enables an improvement in encoding efficiency by maintaining the bandwidth of the reference image or by attenuating noise of the reference image.

The sixth embodiment of the present invention is the moving picture decoding program, method, or device of the second embodiment, wherein:

a plurality of filters in which at least bandwidths are different is used to interpolate the above-described picture elements of the decimal point positions.

The above and other objects, features, and advantages of the present invention will become apparent from the following description with reference to the accompanying drawings, which illustrate examples of the present invention.

BRIEF DESCRIPTION OF THE DRAWINGS

FIG. 14 shows the difference between a filter that interpolates half picture elements and a filter that interpolates quarter picture elements.

FIG. 15 shows the maintenance of edges by interpolating using a filter with broad bandwidth.

FIG. 16 shows how a filter of broad bandwidth also preserves noise.

FIG. 17 a typical schematic block diagram of an information processing system in which the moving picture encoding/decoding device according to the present invention is implemented.

DETAILED DESCRIPTION OF THE PREFERRED EMBODIMENTS

Embodiments of the present invention are next described in detail with reference to the accompanying figures.

First Embodiment

Figure 3:
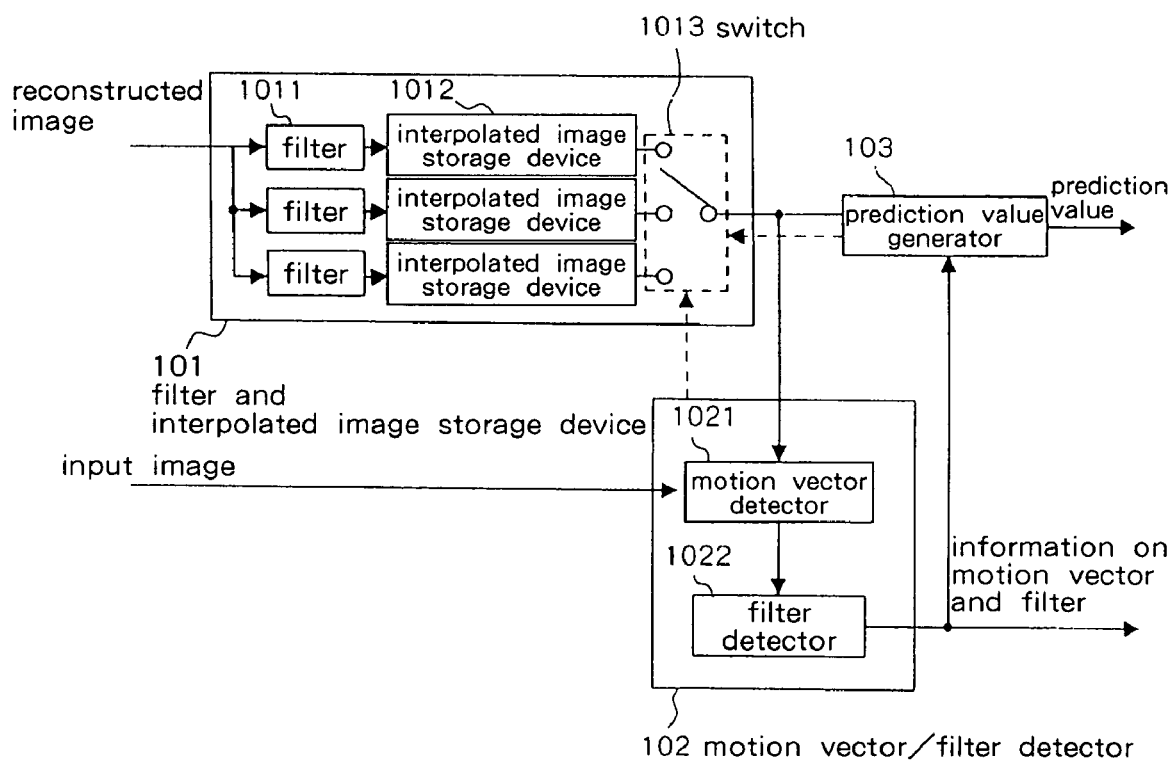
FIG. 3 is a block diagram showing the configuration when a plurality of interpolated image storage devices is provided in the first embodiment of the present invention.

FIG. 3 is a block diagram showing the configuration of the first embodiment of the present invention. The present embodiment is realized by using a typical computer system that is made up of a control device, a storage device, an input device, and a display device. FIG. 3 shows only the principal components of the embodiment.

The embodiment includes filter/interpolated image storage device 101, motion vector/filter coefficient detector 102, and prediction value generator 103. These components correspond to the frame memory/motion compensation/motion vector detection of the encoding method that was shown in FIG. 1, and components other than these have the same composition as the encoding devices shown in FIG. 1. The following explanation of the present embodiment therefore also makes reference to FIG. 1.

The present embodiment is constructed for a case in which the main memory of a computer system that includes the present embodiment has a surplus and can store a plurality of interpolated images. The configuration and operation of the present embodiment are next described.

Filter/interpolated image storage device 101 is made up of: a plurality of sets in each of which filter 1011 is combined with interpolated image storage device 1012; and switch 1013 that receives as input the output of interpolated image storage device 1012 of each set and that selectively supplies any of these inputs as output to motion vector/filter detector 102 and prediction value generator 103.

Each of filters 1011 has a different filter characteristic and generates a decimal point position interpolated image from the reconstructed image that is received as input and stores the generated image in interpolated image storage device 1021.

Interpolated image storage device 1021 stores the interpolated image that is supplied from filter 1011.

When a configuration is adopted in which a means for storing reconstructed images is separately provided and reconstructed images are successively read as necessary, the results of successive calculation by filter 1011 may be supplied as output without providing interpolated image storage device 1021.

Motion vector/filter detector 102 is composed of motion vector detector 1021 and filter detector 1022. This motion vector/filter detector 102 is configured so as to be capable of controlling switch 1013, detects the combination of motion vector and filter that provides the highest encoding efficiency and supplies the detected motion vector and filter to prediction value generator 103 and variable-length encoder 13 (Refer to FIG. 1).

Motion vector detector 1021 is configured to receive images as input and is capable of operating switch 1013, and successively switches switch 1013 to receive and refer to each of the interpolated images that are stored in each of interpolated image storage devices 1012, finds block costs (to be explained hereinbelow) from the input images and interpolated images that it refers to, and supplies the combination of motion vector and prediction error that entails the lowest block cost to filter detector 1022. The prediction error is the difference between the input image and the reconstructed image.

Filter detector 1022 uses the filter information and the motion vectors and prediction errors of each of the interpolated images that are stored in each interpolated image storage device 1012 and that are supplied from motion vector detector 1021 to find encode costs (to be explained hereinbelow), and detects filter 1011 that generated the image having the lowest encode cost. Filter detector 1022 also supplies the combination of filter and motion vector that have been detected to prediction value generator 103 and variable-length encoder 13.

Motion vector detector 1021 and filter detector 1022 may also be realized as a single unit, and may be configured so as to detect the combination of motion vector and filter that obtain the lowest block cost and encode cost.

Similar to motion vector detector 1021, prediction value generator 103 is constructed so as to be capable of operating switch 1013 and uses the motion vectors and filters that are supplied from motion vector/filter detector 102 to generate prediction values. More specifically, prediction value generator 103 refers to interpolated images that correspond to filters by switching switch 1013, and uses the motion vectors to read prediction values from the interpolated images. Motion vector/filter detector 102 may also be provided with the capability of storing prediction values, and motion vector/filter detector 102 may be configured with the capability to directly generate prediction values.

Figure 4:
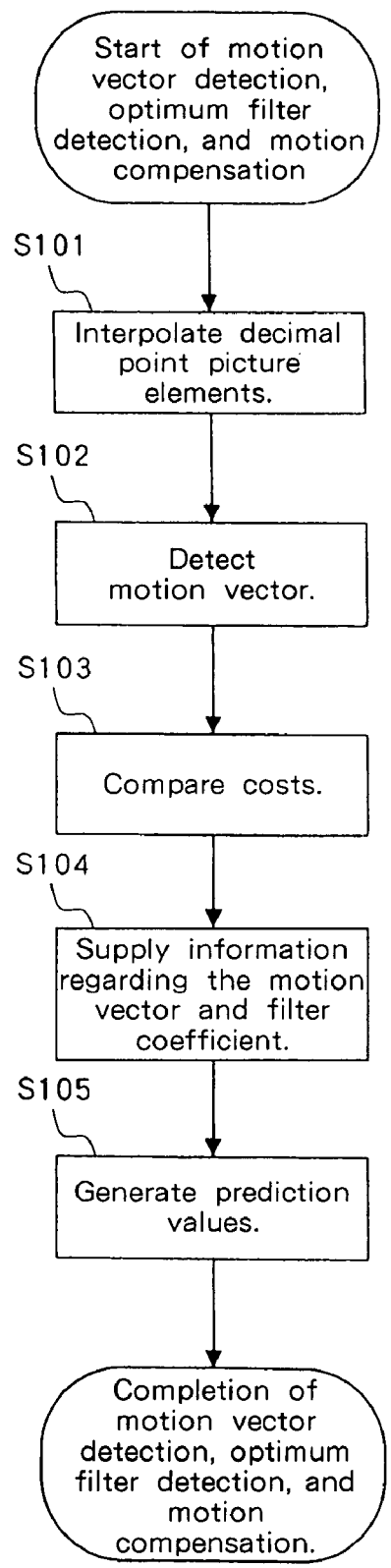
FIG. 4 is a flow chart showing the operations when a plurality of interpolation image storage devices is provided in the first embodiment according to the present invention.

The operation of the present embodiment is explained with reference to FIG. 4. FIG. 4 is a flow chart showing the operation of the present embodiment.

In Step S101, filter/interpolated image storage device 1-01 is used to generate a plurality of decimal point position interpolated images in a reconstructed image and to store a plurality of interpolated images.

If the picture elements that make up an image are x(i, j), the size of an image is W×H, and interpolation filter coefficients are (f1, f2, f3, and f4), the half picture elements that are positioned between x(i, j) and x(i+1, j) are interpolated by means of the following equation:

$$x(i+1/2, j) = (f1 \times x(i-1, j) + f2 \times x(i, j) + f3 \times x(i+1, j) + f4 \times x(i+2, j)) / \sum_{i=1}^{4} fi \quad \text{[Equation 1]}$$

The interpolation of a half picture element is completed by applying Equation 1 to the horizontal direction and vertical direction of the image. The size of the half decimal point position interpolated image is 4×W×H. A quarter picture element and an eighth picture element are obtained by repeating the above-described process, the sizes of the interpolated images being 16×W×H and 64×W×H, respectively.

When interpolating a 1/n picture element, a typical filter that accords with the interpolation accuracy and decimal point picture element position may be used for direct interpolation.

In the succeeding Step S102, motion vector/filter detector 102 is used to find, from each of the interpolated images that were obtained in Step S101, the combination of motion vector and prediction error that obtains the lowest block cost for each of the interpolated images.

Block costs are calculated by motion vector detector 1021 and are represented by the following equation:

$$\text{Block cost} = \sum_{i,j}^{M,N} |s(i,j) - r(i-vx, j-vy)| + \partial \times VF(vx-px, vy-py) \quad \text{[Equation 2]}$$

where picture elements that make up an input image are s(i, j), picture elements that make up an interpolated reconstructed image are s(i, j), the size of a block is M×N, a motion vector is (vx, vy), the prediction of a motion vector is (px, py), the function for finding the amount of vector encoding is VF(x, y), and a is a weighting parameter of the amount of vector encoding.

Next, in Step S103, filter detector 1022 uses the combination of motion vector and prediction error that was obtained in Step S102 and the filter coefficient that specifies the interpolated image to find the encode cost. The encode cost that corresponds to this filter coefficient is given by the equation:

$$\text{Encode cos } t_{\text{coeff }1} = E_{\text{coeff }1} + \partial \times VF(vx-px, vy-py)_{\text{coeff }1} + F(\text{coeff }1) \quad \text{[Equation 3-1]}$$

where E is the code amount of the prediction error, coeff1 is the filter coefficient, and FF (coeff) is the function for finding the code amount of the filter coefficient.

When reducing the amount of calculation required for finding the prediction error code amount, which is the first item in Equation 3-1, the code cost may reuse the block cost:

$$\text{Encode cos } t_{\text{coeff }1} = \text{Block cos } t_{\text{coeff }1} + F(\text{coeff }1) \quad \text{[Equation 3-2]}$$

When the filter is switched in units having the size of block P, (frames are also block groups), the encode cost for the filter coefficient coeff 1 is given by:

$$\text{Encode } cost_{\text{coeff1}} = \sum_{k=1}^{P} (\text{Block } cost_{\text{coeff1}}(k)) + F(\text{coeff1}) \quad \text{[Equation 3-3]}$$

In calculating the block cost, the code amount of the prediction error can obviously be used. When filter coefficients are switched in units of block groups, however, the prediction error and block cost must be stored with the motion vector for the number of blocks, and filter detector 1022 is provided with the capability to store this information.

Next, in Step S104, the combination of filter coefficient and motion vector that obtained the lowest encode cost and that was found in Step S103 is supplied to variable-length encoder 13 and prediction value generator 103.

In Step S105, prediction value generator 103 uses the filter coefficient and motion vector that were obtained in Step S104 to generate a prediction value. In the generation of prediction values, prediction value generator 103 switches switch 1013 in accordance with the filter coefficient to select a referenced interpolated image and uses motion vectors to read and generate prediction values.

Although the method of selecting filter coefficients that have been found beforehand is described in the above-described steps, it goes without saying that this method can be easily combined with an algorithm for estimating the filter coefficients.

Second Embodiment

The second embodiment of the present invention is next explained. The present embodiment is constructed for a case in which the main memory of the computer system that includes the present embodiment has no surplus and is unable to store a plurality of interpolated images. The configuration and operation of this embodiment are described hereinbelow.

Figure 5:
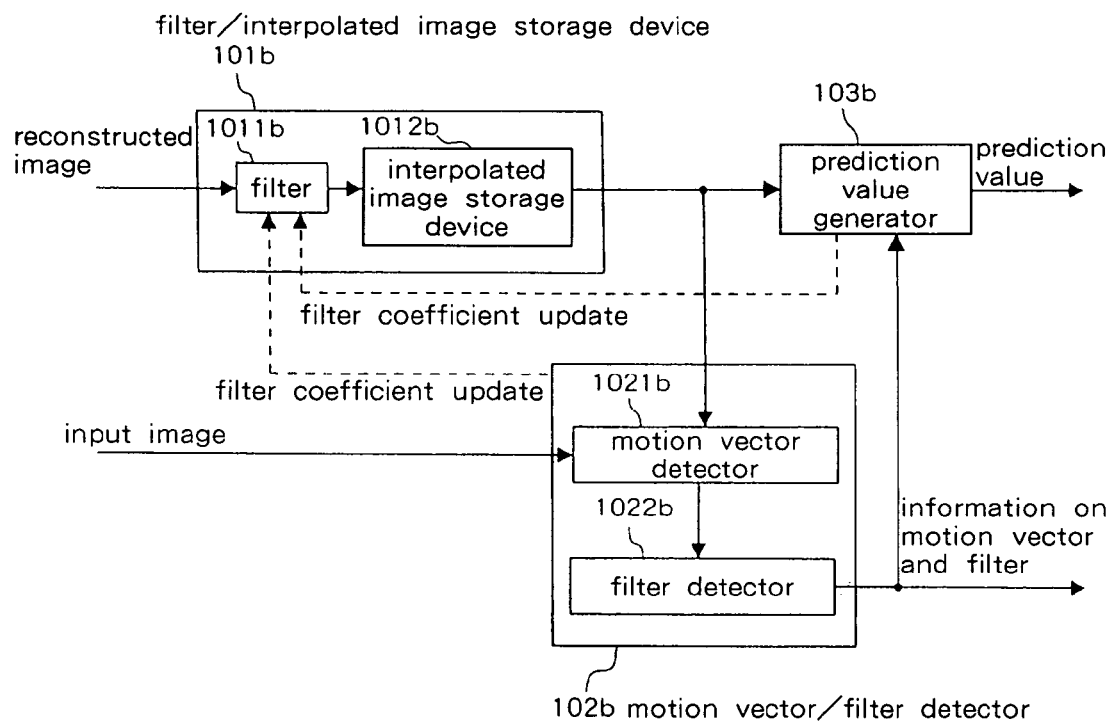
FIG. 5 is a block diagram showing the configuration when one interpolated image storage device is provided in the second embodiment according to the present invention.

FIG. 5 is a block diagram showing the main configuration of the second embodiment of the present invention.

The present embodiment is provided with filter/interpolated image storage device 101b, motion vector/filter coefficient detector 102b, and prediction value generator 103b. Compared with the constituent elements of the embodiment that is shown in FIG. 3, filter/interpolated image storage device 101b performs the same operation as filter/interpolated image storage device 101; motion vector/filter coefficient detector 102b performs the same operation as motion vector/filter coefficient detector 102; and prediction value generator 103b performs the same operation as prediction value generator 103. As for the points of difference between these components, filter 1011b and interpolated image storage device 1012b that form a part of filter/interpolated image storage device 101b are provided in only one set; and motion vector/filter detector 102b and prediction value generator 103b are provided with a signal line for updating the filter coefficient. In addition, switch 1013 is not provided because this configuration contains only one set of filter 1011b and interpolated image storage device 1012b.

Figure 6:
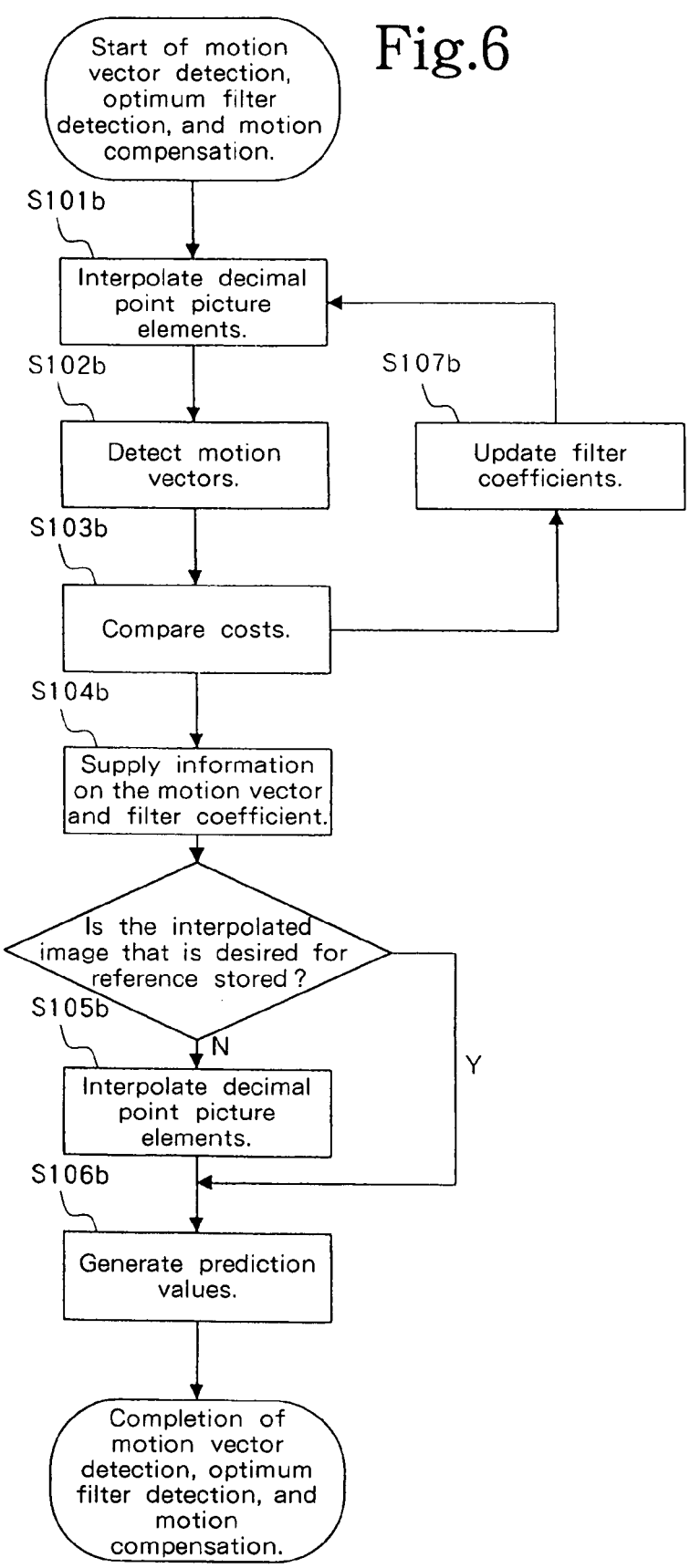
FIG. 6 is a flow chart showing the operations when an interpolated image storage device is not provided in the second embodiment according to the present invention.

FIG. 6 is a flow chart showing the operation of the embodiment shown in FIG. 5.

The flow chart that is shown in FIG. 6 is made up of Steps S101b-S107b, and when compared with the flow chart of the first embodiment that is shown in FIG. 4, equivalent processing is carried out in Step S101b and Step S101, in Step S102b and Step S102, in Step S103b and Step S103, in Step S104b and Step S104, in Step S105b and Step S101, and in Step S106b and Step S105.

The main points of difference between the operations of the present embodiment and those of the first embodiment are the detection of the optimum combination of filter and motion vector while overwriting the interpolated images that are stored in interpolated image storage device 1012b in the decimal point picture element interpolation that is performed in Step S101b, the motion vector detection that is performed in Step S102b, and the cost comparison that is performed in Step S103b. Further, after Step S104b, it is checked whether the interpolated image that prediction value generator 103b wishes to refer to is stored in interpolated image storage device 1012b, and if the interpolated image is not stored in interpolated image storage device 1012b, the decimal point picture element interpolation is again performed in Step S105b, following which a prediction value is generated in Step S106b.

The configuration of the present embodiment is effective when no surplus exists in the main memory. However, when the desired interpolated image does not remain in interpolated image storage device 1012b, an interpolated image must again be generated by the filter, resulting in an increase in the amount of calculations when compared with the first embodiment.

Third Embodiment

The following explanation regards the third embodiment of the present invention. The present embodiment is constructed for a case in which the main memory of the computer system that includes the present embodiment has no surplus in decoding and cannot store decimal point position interpolated images. The configuration and operation of the present embodiment are as described hereinbelow.

Figure 1:
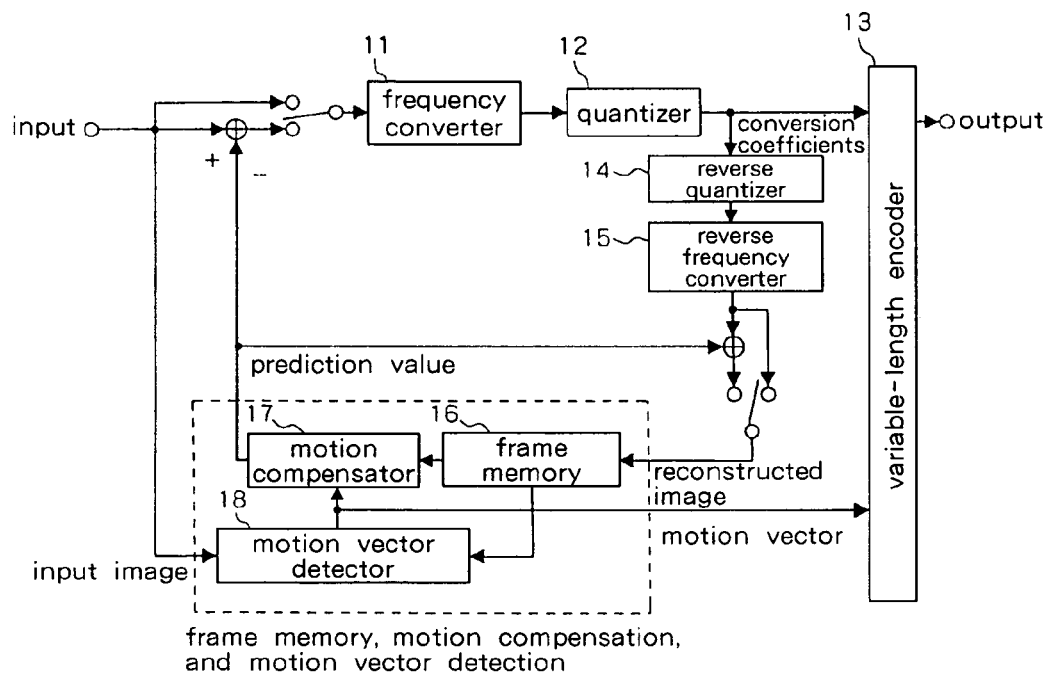
FIG. 1 is a block diagram showing an encoding device of the prior art.
Figure 2:
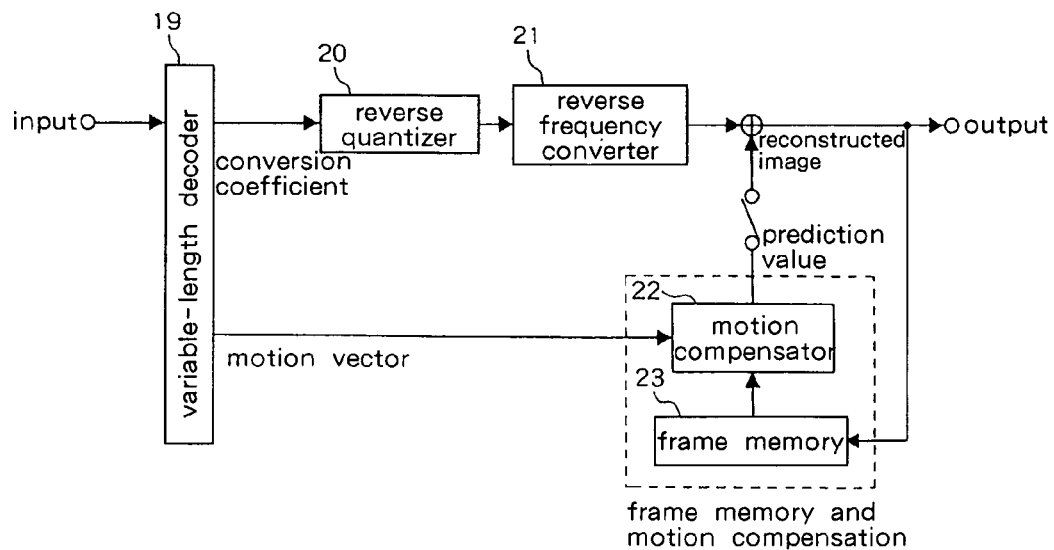
FIG. 2 is a block diagram showing a decoding device in the prior art.
Figure 7:
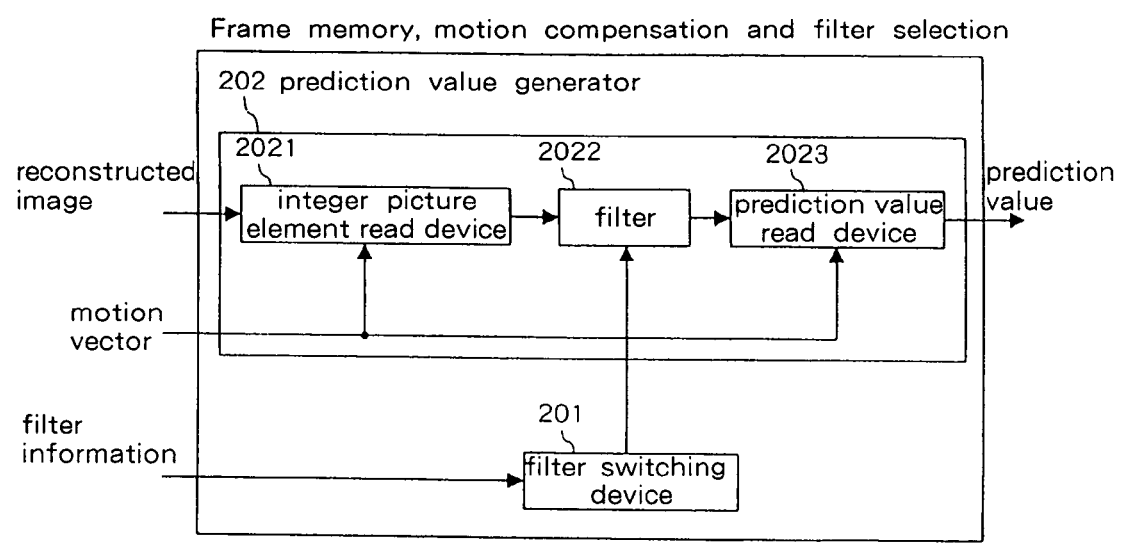
FIG. 7 is a block diagram showing the configuration when an interpolated image storage device is not provided in the third embodiment according to the present invention.

FIG. 7 is a block diagram showing the principal configuration of the present embodiment. The present embodiment includes filter switching device 201 and prediction value generator 202. These components correspond to the frame memory/motion compensator/motion vector detection of the encoding system that is shown in FIG. 1, and constituent elements other than these components are of the same construction as the encoder shown in FIG. 1. The following explanation of the present embodiment therefore also makes reference to FIG. 1.

Filter switching device 201 switches the filter coefficient of prediction value generator 202 in accordance with filter coefficient information that is supplied from variable-length decoding.

Prediction value generator 202 is made up of: integer picture element read device 2021, filter 2022, and prediction value read device 2023. Prediction value generator 202 uses the motion vectors that are supplied from variable-length decoding to read integer picture elements from a reconstructed image and performs filtering to generate prediction values.

Integer picture element read device 2021 uses motion vectors that are supplied from variable-length decoding to read integer picture elements that include prediction values from a reconstructed image. The integer picture elements that are read are supplied to filter 2022.

Filter 2022 uses the filter coefficients that are switched by filter switching device 201 to interpolates the decimal point picture elements in the integer picture elements that are supplied from integer picture element read device 2021. It will be obvious that the filter coefficients can be directly switched by means of the filter coefficient information that is supplied from variable-length decoding.

Prediction value read device 2023 uses the interpolated picture elements that are supplied from filter 2022 and the motion vectors that are supplied from variable-length decoding to read prediction value blocks.

Figure 8:
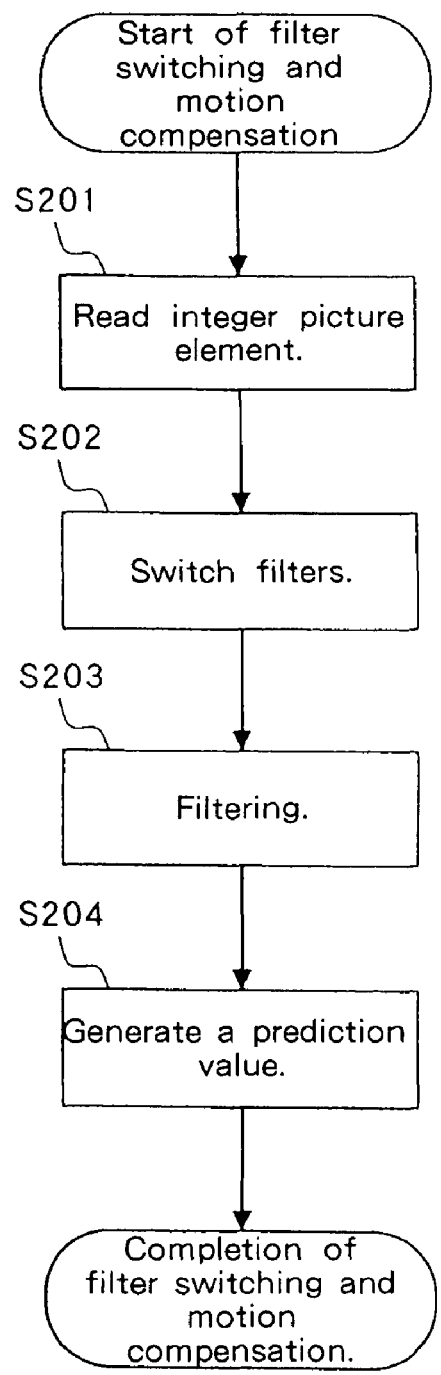
FIG. 8 is a flow chart showing the operation when a plurality of interpolated image storage devices are provided in the third embodiment according to the present invention.

FIG. 8 is a flow chart showing the operations of the embodiment that is shown in FIG. 7.

In Step S201, integer picture element read device 2021 uses motion vectors that are supplied by variable-length decoding to read integer picture element blocks from a reconstructed image.

In Step S202, filter switching device 201 uses filter coefficient information that is supplied by variable-length decoding to switch the filter coefficients of filter 2022.

In Step S203, filter 2022 uses the filter coefficients that are switched by Step S202 to perform decimal point picture element interpolation of the integer picture elements that are supplied from integer picture element read device 2021.

In Step S204, prediction value read device 2023 uses the motion vectors that are supplied from variable-length decoding to read prediction values from the interpolated images that were obtained in Step S203.

Fourth Embodiment

The following explanation regards the fourth embodiment of the present invention. The present embodiment is constructed for a case in which there is a surplus in the main memory of the computer system that includes the present embodiment and a plurality of decimal point position interpolated images can be stored. The configuration and operation of the present embodiment are described hereinbelow.

Figure 9:
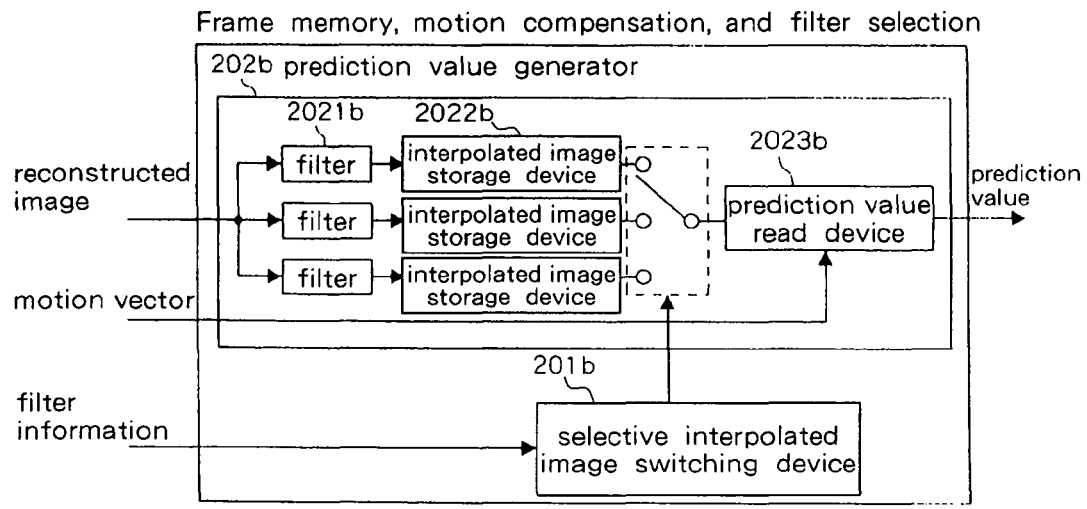
FIG. 9 is a block diagram showing the configuration when a plurality of interpolated image storage devices are provided in the fourth embodiment according to the present invention.

FIG. 9 is a block diagram showing the principal configuration of the fourth embodiment of the present invention.

As shown in FIG. 9, the present embodiment includes selective interpolated image switching device 201b and prediction value generator 202b. Selective interpolated image switching device 201b uses filter coefficient information that is supplied from variable-length decoding to switch the interpolated images that prediction value generator 202b refers to.

Prediction value generator 202b is made up of a plurality of sets of filters 2021b and interpolated image storage devices 2022b and a prediction value read device 2023b.

Filter 2021b and interpolated image storage device 2022b perform filter calculation and store decimal point picture element interpolated images. Prediction value read device 2023b refers to interpolated images that are selected by selective interpolated image switching device 201b and uses motion vectors that are supplied from variable-length decoding to read prediction values.

Figure 10:
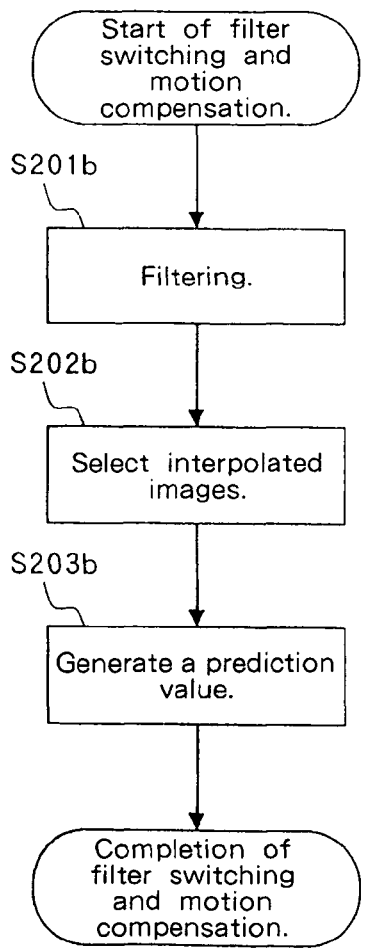
FIG. 10 is a flow chart showing the operation when a plurality of interpolated image storage devices are provided in the fourth embodiment according to the present invention.

FIG. 10 is a flow chart showing the operation of the embodiment that is shown in FIG. 9.

In Step S201b, a plurality of decimal point position interpolated images are generated from reconstructed images and stored by a plurality of sets of filters 2021b and interpolated image storage devices 2022b.

In Step S202b, selective interpolated image switching device 201b uses filter coefficient information that is supplied from variable-length decoding to select interpolated images that prediction value read device 2023b refers to.

In Step S203b, prediction value read device 2023b reads prediction values by using motion vectors that are supplied from variable-length decoding and interpolated images that have been stored in interpolated image storage device 2022b and selected by selective interpolated image switching device 201b.

The above-described configuration does not require switching of decimal point position interpolated image filters in region, block, or picture element units, and as a result, the architecture of the processor is effective for cases in which the overhead of filter coefficient switching is not desirable, and moreover, in which the main memory has a large capacity.

Fifth Embodiment

The following explanation regards the fifth embodiment of the present invention. The principal configuration of the present embodiment is similar to that of the first embodiment that is shown in FIG. 3 or the second embodiment that is shown in FIG. 5, and a figure for this configuration is therefore omitted.

As the filter coefficients that are used in filters 1011 and 1011b in the first or second embodiment, the present embodiment employs a plurality of filter coefficients that at least have different phases, and the operation of this embodiment is similar to that of the first embodiment or second embodiment.

Regarding the effects of the present embodiment, explanation first regards the effects obtained by shifting the phase of the filters.

Figure 11:
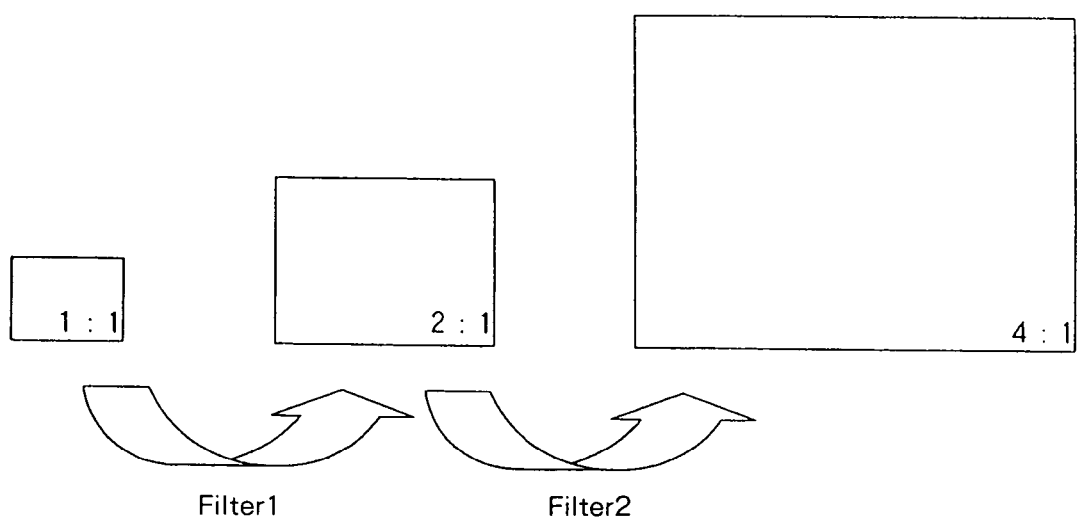
FIG. 11 shows the steps of interpolating decimal point picture elements.

Explanation first regards the operation of the quarter picture element interpolation that is carried out in the prior art. As shown in FIG. 11, the decimal point picture element interpolation is carried out by a two-stage process in which half picture elements are generated from integer picture elements by means of first-stage processing that employs filter 1 and quarter picture elements are generated from half picture elements by means of second-stage processing that employs filter 2.

Figure 12A:
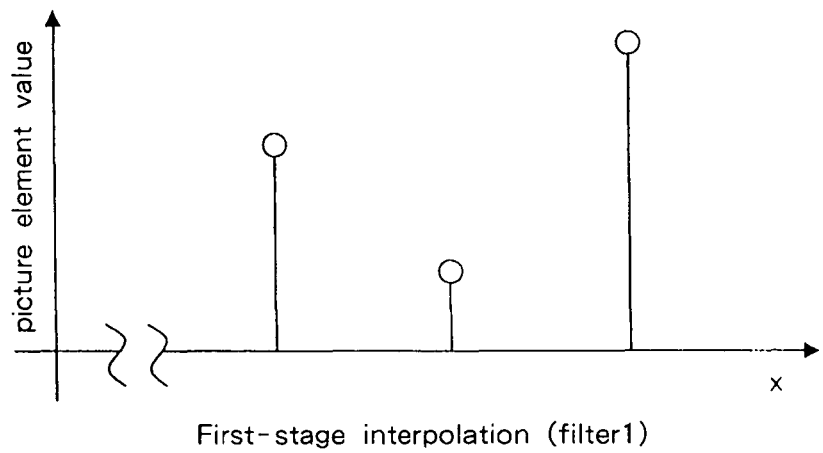
FIG. 12 shows a case of interpolating decimal point picture elements without shifting phase.
Figure 12B:
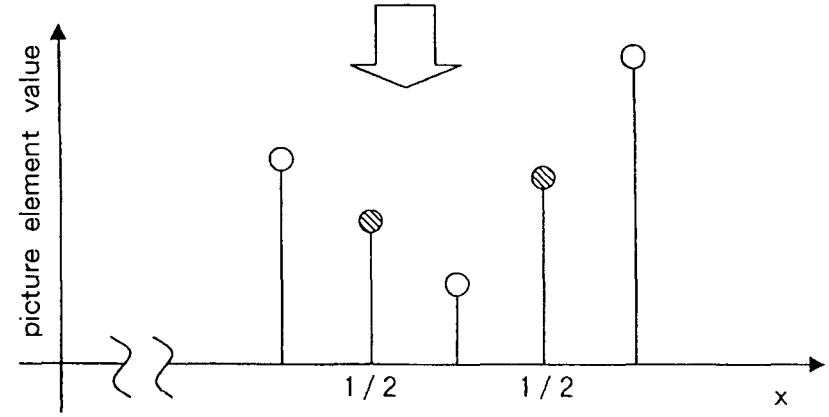
Figure 12C:
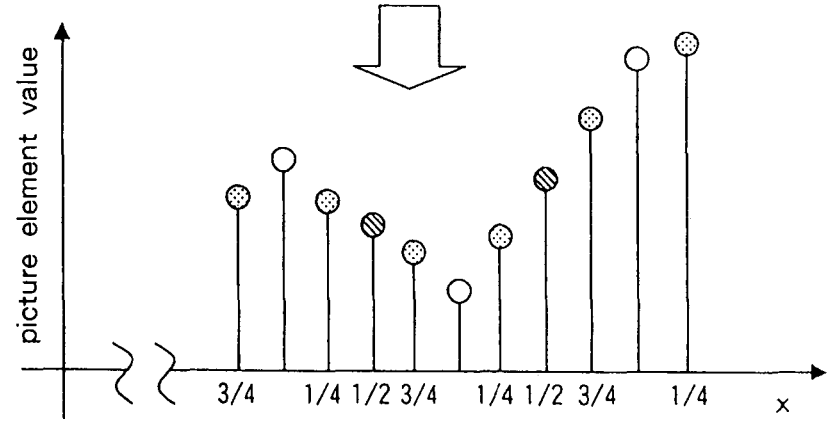

Intermediate position interpolation is repeated as shown in FIG. 12(a)-(c) by the above-described two-stage processing. The interpolation produces three decimal point picture elements in the space between integer picture elements that are aligned in the horizontal direction.

Figure 13D:
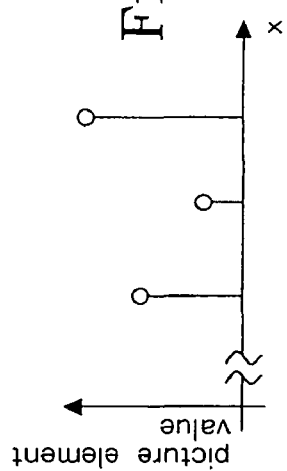
FIG. 13 shows a case of interpolating decimal point picture elements while shifting phase.
Figure 13E:
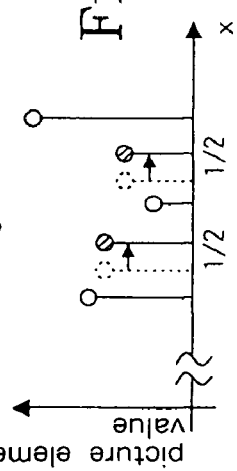
Figure 13F:
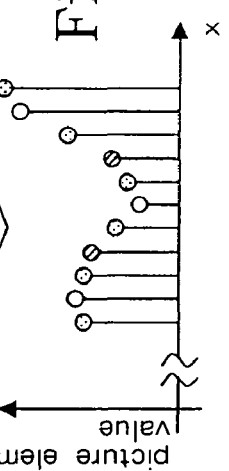
Figure 13A:
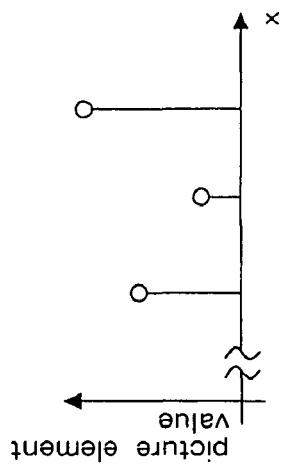
Figure 13B:
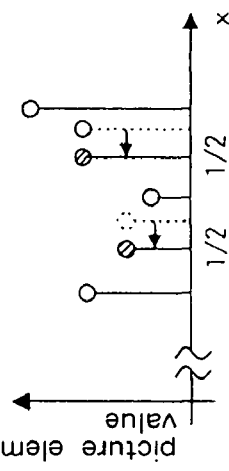
Figure 13C:
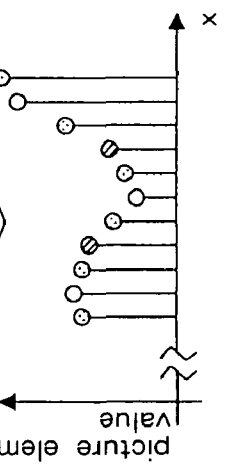

As shown in FIG. 13(a)-(c), shifting only first-stage interpolation filters one quarter toward the right results in apparent increments of one quarter, but ⅛ and ⅝ picture elements can be produced in the second-stage interpolation. Further, as shown in FIG. 13(d)-(f), shifting one quarter toward the left can produce ⅜ and ⅞ picture elements in second stage interpolation.

As previously described, even in motion compensation having an apparent accuracy of one-quarter picture element, shifting a filter one-quarter to the left or right allows the three decimal point picture elements that are interpolated between integer picture elements to take on values of one-eighth increments. Of course, it will be obvious that, depending on the method of phase shifting, the decimal point picture elements can take on values of one-sixteenth or one-thirty-second increments.

The following explanation regards the method of shifting phase that is used in the present embodiment.

FIGS. 14(a) and 14(b) show the filter coefficients of a filter that interpolates ½ picture elements and a filter that interpolates ¼ picture elements.

In each figure, the dotted lines show ideal filters, and the solid lines show filters in which the dotted line is shifted ½ or ¼ picture element. In the example that is shown in FIG. 14(a), a filter coefficient for finding the picture element value of the ½ picture element position is shown, and this filter coefficient (a, b, c, c, b, a) is obtained by shifting the ideal filter by ½. The ½ position picture element value P(½) is found by means of the following equation:

$$\text{Encode } cost_{coeff1} = \sum_{k=1}^{P} (\text{Block } cost_{coeff1}(k)) + F(coeff1) \quad \text{[Equation 3-3]}$$

where P(i) is the picture element value.

In the example shown in FIG. 14(b), a filter coefficient for finding the picture element value of a ¼ picture element position is shown, and this filter coefficient (d, e, f, g, h, i) is obtained by shifting the ideal filter by ¼. As in the case of the ½ position, a picture element value P(¼) of the ¼ position is found by the following equation:

$$P(¼)=(d \times P(-2)+e \times P(-1)+f \times P(0)+g \times P(1)+h \times P(2)+i \times P(3))/(d+e+f+g+h+i) \quad \text{[Equation 4-2]}$$

To shift the picture elements of interpolated decimal point positions ¼ to the right, instead of filter A that interpolates ½ picture elements at the ½ position, filter B is used that interpolates ¼ picture elements at the same ½ position. In other words, switching the filter coefficient enables control over the phase.

Each of filters 1011 or 1011b in the present embodiment have filter coefficients with different phases as described above, and the use of these filters for interpolation not only obtains the effect of the first or second embodiment, but enables motion compensation of precise accuracy and improves encoding efficiency.

Sixth Embodiment

Explanation next regards the sixth embodiment of the present invention. The principal configuration of the present embodiment is the same as the configuration of the third embodiment that is shown in FIG. 7 or the fourth embodiment that is shown in FIG. 9, and a figure for this configuration is therefore here omitted.

The present embodiment features the use of a plurality of filter coefficients having at least different phases as the filter coefficients that are used in filters 2022 and 2021b in the third or the fourth embodiment, and the operation is the same as that of the third embodiment or the fourth embodiment.

In addition, the filters of different phases are the same as the filters that were shown in the fifth embodiment, and detailed explanation is therefore here omitted.

The present embodiment not only realizes the effects of the third or the fourth embodiments, but also allows motion compensation of precise accuracy and improved encoding efficiency.

Seventh Embodiment

Explanation next regards the seventh embodiment of the present invention. The principal configuration of the present embodiment is the same as the configuration of the first embodiment shown in FIG. 3 or the second embodiment shown in FIG. 5, and a figure for this configuration is therefore here omitted.

The present embodiment features the use of filters having at least filter coefficients of different bandwidths as filters 1011 and 1011b in the first or second embodiment, and is similar in operation to the first embodiment or the second embodiment.

Regarding the effects of the present embodiment, the effects obtained by changing the filter bandwidth will first be explained.

FIG. 15 shows a case of interpolating decimal point picture elements using a filter of broad bandwidth, and a case of interpolating decimal point picture elements using a filter of narrow bandwidth.

From the image shown in FIG. 15(a), the interpolated images that are shown in FIGS. 15(c) and 15(d) were obtained by using a filter having the broad bandwidth amplitude characteristic and a filter having the narrow bandwidth amplitude characteristic that are shown in FIG. 15(b). From FIG. 15(c), it can be seen that interpolating decimal point picture elements by means of the broad bandwidth filter enables the preservation of edge information. The use of a broad bandwidth filter maintains the edge information in an image having many edges, i.e., having many high-frequency components, and improves the effect of motion compensation.

However, when quantization noise is frequently generated as false edges at a low bit rate, the use of a broad bandwidth filter to interpolate decimal point picture elements also preserves the noise. FIGS. 16(a)-(d) show examples of these states of preservation whereby the effect of motion compensation is degraded. As a result, at a low bit rate, the use of a narrow bandwidth filter coefficient in decimal point picture element interpolation can improve the encoding efficiency.

A method is next explained in which bandwidth is modified for maintaining decimal point picture elements.

Assuming that the coefficient of the broad bandwidth filter that is shown in FIG. 15 and FIG. 16 is A and the coefficient of the narrow bandwidth filter is B, switching the filter coefficient from A to B enables decimal point interpolation by means of a narrow bandwidth filter, and switching the filter coefficient from B to A enables decimal point interpolation by means of a broad bandwidth filter.

In other words, the bandwidth for preserving decimal point picture elements can be modified by switching filter coefficients that correspond to each bandwidth characteristic and then interpolating.

Eighth Embodiment

The eighth embodiment of the present invention is next described. The principal configuration of the present embodiment is equivalent to that of the third embodiment shown in FIG. 7 or the fourth embodiment shown in FIG. 9, and a figure for this configuration is therefore here omitted.

The present embodiment features the use of filters having filter coefficients of at least different bandwidths as filters 2022 and 2021b in the third or fourth embodiment, and the operation of the present embodiment is equivalent to that of the third embodiment or the fourth embodiment. In addition, the filters of differing bandwidth are the same as the filters shown in the seventh embodiment, and detailed explanation is therefore here omitted.

The present embodiment can obtain not only the effects of the third or fourth embodiment, but can also modify the bandwidth for preserving decimal point picture elements.

FIG. 17 is a block diagram showing the schematic configuration of an example of an information processing system that implements a moving picture encoding/decoding device according to the present invention.

As should be clear from the preceding explanation, the moving picture encoding/decoding device according to the present invention can be constituted by hardware, or can be realized by a computer program.

The information processing system that is shown in FIG. 17 is made up of processor 301, program memory 302, and storage mediums 303 and 304. Storage mediums 303 and 304 may be separate storage mediums, or may be storage areas that are constituted by the same storage medium. The storage medium can employ a magnetic storage medium such as a hard disk.

The present invention enables an improvement in the encoding efficiency of a moving picture by switching the filter coefficient for decimal point position interpolation according to the bit rate or nature of a moving picture. This switching of filter coefficient includes both filter selection and estimation. Filter selection means that filter coefficients having different bandwidth and phase are prepared in advance and the optimum filter coefficient then selected from the prepared filter coefficients. On the other hand, filter estimation means that filter coefficients are calculated by means of, for example, adaptive algorithms and the calculated filter coefficients then used in switching.

Manipulating the filter phase enables motion compensation of precise accuracy and improves the encoding efficiency; while manipulating filter bandwidth enables control over the high-frequency region components of an image and quantization noise, whereby the effect of motion compensation can be increased and the encoding efficiency improved.

In addition, switching the filter coefficients by units greater than image block units does not alter the calculation load of filtering and also results in low overhead calculation load due to switching, and the increase in calculation load for decoding is therefore also low.

What is claimed is:

1. A moving picture encoding method executed by a processor, the method comprising:
    performing a plurality of interpolation processings on a reference image using respective plurality of interpolation processings, each of the plurality of interpolation processings having different characteristics;
    detecting a motion vector having a highest encoding efficiency from a plurality of motion vectors generated for the plurality of interpolated images; and
    selecting an interpolation processing of said reference image that generates said motion vector having the highest encoding efficiency from said plurality of interpolation processings,
    wherein said interpolation processing includes filtering for realizing a shift of an amount of phase which is different from an amount of phase corresponding to a positional difference between a picture element of said reference image and a corresponding picture element of said reference image on which interpolation processing is performed when picture element values of said reference image on which interpolation processing is performed are derived from picture element values of said reference image.

2. A moving picture encoding method according to claim 1, wherein a position of a picture element of said reference image on which interpolation processing is a position which said motion vector shows.

3. A moving picture encoding method according to claim 1, wherein accuracy of said shift of an amount of phase which is different from an amount of phase corresponding to a positional difference is decimal point accuracy of picture elements.

4. A moving picture encoding method according to claim 1, wherein accuracy of said motion vector is decimal point accuracy of picture elements.

5. A moving picture encoding method according to claim 1, wherein said highest encoding efficiency is that an amount of a difference between a reference image and an image that has been received is smallest and that a weighted sum of said motion vector and an amount of transmission codes of identifying codes for interpolation processing is smallest.

6. A moving picture decoding method executed by a processor, the method comprising the steps of:
    generating a plurality of interpolated images from a reference image using respective plurality of interpolation processings, each of the plurality of interpolation processings having different characteristics;
    detecting a motion vector having a highest encoding efficiency from a plurality of motion vectors generated for the plurality of interpolated images;
    selecting an interpolation processing that generates said motion vector having the highest encoding efficiency from the plurality of interpolation processings used for generating the plurality of interpolated images based on the detected motion vector; and
    predicting motion compensation based on information of the detected motion vector and selected interpolation processing,
    wherein said selected interpolation processing is filtering for realizing a shift of an amount of phase which is different from an amount of phase corresponding to a positional difference between a picture element of said reference image and said reference image on which interpolation processing is realized when picture element values of said reference image on which interpolation processing is realized are derived from picture element values of said reference image.

7. A moving picture decoding method according to claim 6, wherein a position of a picture element of said reference image on which interpolation processing is a position which said motion vector shows.

8. A moving picture decoding method according to claim 6, wherein accuracy of said shift of an amount of phase which is different from an amount of phase corresponding to a positional difference is decimal point accuracy of picture elements.

9. A moving picture decoding method according to claim 6, wherein accuracy of said motion vector is decimal point accuracy of picture elements.

10. A moving picture encoding method executed by a processor, the method comprising the steps of:
    interpolating a plurality of images by using a plurality of filters at decimal point positions in a reference image which is represented by a motion vector of decimal point accuracy;
    detecting a combination of a motion vector and a filter having a highest encoding efficiency from said interpolated reference image and an image that has been received;
    selecting an interpolation processing that generates said motion vector having the highest encoding efficiency from the plurality of interpolation processings used for generating the plurality of interpolated images; and
    predicting motion compensation of decimal point accuracy by using a reference image corresponding to decimal point position of detected motion vector and detected filter and realizing variable length encoding of information of detected filter and motion vector,
    wherein in said interpolating, decimal point accuracy of a phase of said plurality of filters is different from decimal point accuracy of the motion vector.

11. A moving picture decoding method executed by a processor, the method comprising the steps of:
    selecting a filter for interpolating decimal point positions in a reference image which is represented by a motion vector of decimal point accuracy having a highest encoding efficiency and by information of the filter that has been received; and
    predicting motion compensation of decimal point accuracy based on information of the motion vector that has been received and the selected filter, wherein phases of filters of selection candidates are different one another.

12. A moving picture decoding method according to claim 11, wherein decimal point accuracy of the phase of said filter is different from decimal point accuracy of the motion vector.

13. A moving picture encoding device comprising:
    a plurality of interpolation filters for realizing a plurality of interpolation processings on a reference image;
    a motion vector detector for detecting a motion vector of said plurality of interpolation processings having a highest encoding efficiency; and
    a processing selector for selecting an interpolation processing of said reference image that generates said motion vector having the highest encoding efficiency from said plurality of interpolation processings
    wherein said selected interpolation processing includes a filter for realizing a shift of an amount of phase which is different from an amount of phase corresponding to a positional difference between a picture element of said reference image and said reference image on which interpolation processing is realized when picture element values of said reference image on which interpolation processing is realized are derived from picture element values of said reference image.

14. A moving picture encoding device according to claim 13, wherein a position of a picture element of said reference image on which interpolation processing is a position which said motion vector shows.

15. A moving picture encoding device according to claim 13, wherein accuracy of said shift of an amount of phase which is different from an amount of phase corresponding to a positional difference is a decimal point accuracy of picture elements.

16. A moving picture encoding device according to claim 13, wherein an accuracy of said motion vector is a decimal point accuracy of picture elements.

17. A moving picture encoding device according to claim 13, wherein said highest encoding efficiency is that an amount of a difference between a reference image and an image that has been received is smallest and that a weighted sum of said motion vector and an amount of transmission codes of identifying codes for interpolation processing is smallest.

18. A moving picture decoding device comprising:
means for detecting a motion vector and prediction error having the lowest block cost;
means for selecting an interpolation processing having a lowest encode cost from a plurality of interpolation processings;
means for generating prediction of motion compensation based on information of a selected motion vector and said selected interpolation processing; and
an interpolation filter for performing said interpolation processing as filtering for realizing a shift of an amount of phase which is different from an amount of phase corresponding to a positional difference between a picture element of said reference image and said reference image on which interpolation processing is realized when picture element values of said reference image on which interpolation processing is realized are derived from picture element values of said reference image.

19. A moving picture decoding device according to claim 18, wherein a position of a picture element of said reference image on which interpolation processing is a position which said motion vector shows.

20. A moving picture decoding device according to claim 18, wherein, an accuracy of said shift of an amount of phase which is different from an amount of phase corresponding to a positional difference is a decimal point accuracy of picture elements.

21. A moving picture decoding device according to claim 18, wherein an accuracy of said motion vector is a decimal point accuracy of picture elements.

22. A moving picture encoding device comprising:
means for interpolation of a plurality of images by using a plurality of filters at decimal point positions in a reference image which is represented by a motion vector of decimal point accuracy;
means for detection of a combination of motion vector and filter having a highest encoding efficiency from said interpolated reference image and an image that has been received;
means for selecting a filter of a reference image that generates said motion vector having the highest encoding efficiency from said plurality of filters;
means for prediction of motion compensation of decimal point accuracy by using said reference image corresponding to decimal point position of the detected combination of motion vector and detected filter; and
means for variable length encoding of information of detected filter and motion vector, wherein, in said means for realizing interpolation, a decimal point accuracy of phase of said plurality of filters is different from a decimal point accuracy of the motion vector.

23. A moving picture decoding device comprising:
means for selection of a filter that generates a motion vector having a highest encoding efficiency from a plurality of filters, said selected filter interpolating decimal point positions in a reference image which is represented by said motion vector of decimal point accuracy by information of filter that has been received; and
means for prediction of motion compensation of decimal point accuracy based on information of said motion vector that has been received and said selected filter, wherein phases of said plurality of filters are different from one another.

24. A moving picture decoding device according to claim 23, wherein a decimal point accuracy of phase of said filter is different from the decimal point accuracy of motion vector.

25. A computer readable medium in which a program is stored, said program is a moving picture encoding program for causing a computer to execute said moving picture encoding method according to claim 1.

26. A computer readable medium in which a program is stored, said program is a moving picture encoding program for causing a computer to execute said moving picture encoding method according to claim 10.

27. A computer readable medium in which a program is stored, said program is a moving picture decoding program for causing a computer to execute said moving picture decoding method according to claim 6.

28. A computer readable medium in which a program is stored, said program is a moving picture decoding program for causing a computer to execute said moving picture decoding method according to claim 11.

* * * * *